United States Patent
Murakami et al.

(10) Patent No.: US 11,305,809 B2
(45) Date of Patent: Apr. 19, 2022

(54) MOTOR CONTROL DEVICE

(71) Applicant: DENSO CORPORATION, Kariya (JP)

(72) Inventors: Yuta Murakami, Kariya (JP); Toru Oiwa, Kariya (JP); Koji Isogai, Kariya (JP)

(73) Assignee: DENSO CORPORATION, Kariya (JP)

( * ) Notice: Subject to any disclaimer, the term of this patent is extended or adjusted under 35 U.S.C. 154(b) by 142 days.

(21) Appl. No.: 16/559,948

(22) Filed: Sep. 4, 2019

(65) Prior Publication Data

US 2019/0389507 A1 Dec. 26, 2019

Related U.S. Application Data

(63) Continuation of application No. PCT/JP2018/005831, filed on Feb. 20, 2018.

(30) Foreign Application Priority Data

Mar. 6, 2017 (JP) .............................. JP2017-041565

(51) Int. Cl.
  *B62D 5/04* (2006.01)
  *H02P 29/032* (2016.01)
  *B62D 6/00* (2006.01)
  *G01L 3/04* (2006.01)
  *H02P 6/08* (2016.01)
  (Continued)

(52) U.S. Cl.
  CPC .......... *B62D 5/0463* (2013.01); *B62D 5/0481* (2013.01); *B62D 6/00* (2013.01); *G01L 3/04* (2013.01); *H02P 6/08* (2013.01); *H02P 27/04* (2013.01); *H02P 29/032* (2016.02); *B60W 30/08* (2013.01); *B60W 2510/083* (2013.01)

(58) Field of Classification Search
  CPC .......... H02P 29/032; H02P 6/08; H02P 27/04; B62D 5/0463; B62D 5/0481; B62D 6/00; G01L 3/04
  USPC ...................................................... 318/400.21
  See application file for complete search history.

(56) References Cited

U.S. PATENT DOCUMENTS

| | | | |
|---|---|---|---|
| 5,142,210 A * | 8/1992 | Kojima | G05B 19/4062 318/275 |
| 2008/0271942 A1* | 11/2008 | Yamashita | B62D 5/04 180/443 |
| 2009/0187312 A1 | 7/2009 | Nozawa et al. | |

(Continued)

FOREIGN PATENT DOCUMENTS

| JP | 2000-145491 A | 5/2000 |
|---|---|---|
| JP | 4222358 B2 | 2/2009 |

(Continued)

*Primary Examiner* — Kawing Chan
(74) *Attorney, Agent, or Firm* — Maschoff Brennan

(57) ABSTRACT

A motor control device controls driving of a motor, which outputs torque to a rack shaft as a load by rotation of a shaft fixed to a rotor. The motor control device has a rotation stress check unit for determining a rotation stress indicating a rotation stress, which is applied inversely from the load to a protection target member such as a shaft, bearing and oil seal related to the rotation of the shaft or torque transmission to the load. The rotation stress check unit determines the rotation stress is excessive based on that an absolute value of a rotation evaluation value exceeds a stress threshold value. The stress threshold value is set to be larger than an absolute value of an upper limit value realized in normal drive control.

12 Claims, 12 Drawing Sheets

(51) Int. Cl.
*H02P 27/04* (2016.01)
*B60W 30/08* (2012.01)

(56) References Cited

U.S. PATENT DOCUMENTS

| | | | | |
|---|---|---|---|---|
| 2012/0259512 A1* | 10/2012 | Okada | ................ | B62D 5/0481 |
| | | | | 701/41 |
| 2016/0149531 A1 | 5/2016 | Yoshida | | |
| 2017/0257054 A1* | 9/2017 | Tsu | ..................... | B60K 6/46 |
| 2019/0389507 A1* | 12/2019 | Murakami | ............ | H02P 29/032 |

FOREIGN PATENT DOCUMENTS

| | | | |
|---|---|---|---|
| JP | 2009-119033 A | 6/2009 | |
| JP | 2010-241165 A | 10/2010 | |
| JP | 2016-097839 A | 5/2016 | |
| WO | WO-2016091199 A1 * | 6/2016 | ............... B66B 1/28 |

\* cited by examiner

MOTOR CONTROL DEVICE

CROSS REFERENCE TO RELATED APPLICATIONS

The present application is a continuation application of International Patent Application No. PCT/JP2018/005831 filed on Feb. 20, 2018, which designated the U.S. and claims the benefit of priority from Japanese Patent Application No. 2017-041565 filed on Mar. 6, 2017. The entire disclosures of all of the above applications are incorporated herein by reference.

FIELD

The present disclosure relates to a motor control device.

BACKGROUND

Conventionally, it is proposed to detect a mechanical shock externally applied to a device for driving a motor. For example, a collision detection unit of a power steering device determines that a collision of peripheral components with respect to the power steering device has occurred when a rotation angular velocity of a rotor of a motor exceeds a predetermined collision determination threshold value. In addition, it is proposed to discriminate a fluctuation of the rotation angular velocity of the rotor due to collision of the peripheral components from a fluctuation of the rotation angular velocity of the rotor due to reverse input from road wheels by using a mean value and a frequency spectrum of a rotation angular velocity signal.

SUMMARY

The present disclosure provides a motor control device for controlling driving of a motor, which outputs torque to a load mounted in a vehicle by rotation of a rotor and a shaft through a protection target member. The motor control device determines a rotation stress abnormality indicating that a rotation stress, which is applied inversely from the load to the protection target member related to the rotation of the shaft or torque transmission to the load, is excessive based on that a rotation evaluation value exceeds a stress threshold value set to be larger than an upper limit value realized in normal drive control.

BRIEF DESCRIPTION OF THE DRAWINGS

The above and other objects, features and advantages of the present disclosure will become more apparent from the following detailed description taken in conjunction with the accompanying drawings. In the drawings.

EMBODIMENT

A motor control device according to one embodiment will be described with reference to the accompanying drawings. The motor control device of the present embodiment is an electronic control unit (hereinafter referred to as ECU) that controls driving of a steering assist motor in an electric power steering system (hereinafter referred to as EPS) of a vehicle, and is specifically configured as an EPS-ECU.

(Embodiment)

Figure 1:
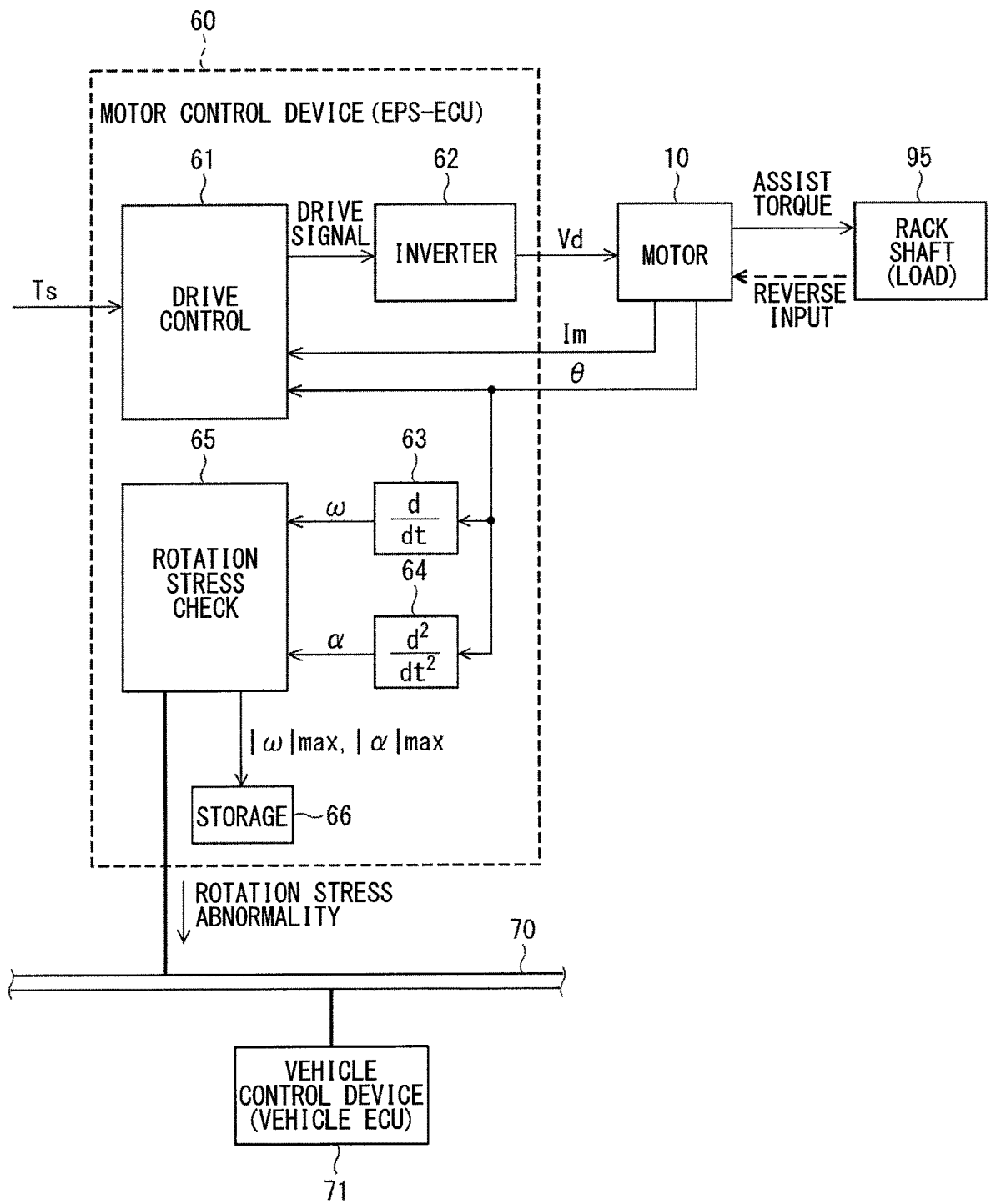
FIG. 1 is a configuration diagram of a motor control device according to one embodiment.

As shown in FIG. 1, a motor control device 60 is configured to include a drive control unit 61, an inverter 62, a differentiation unit 63, a second-order differentiation unit 64, a rotation stress check unit 65, a storage device 66 and the like to control driving of a motor 10. For example, in a parallel rack type EPS shown in FIG. 2, an assist torque output from the motor 10 is transmitted to a rack shaft 95 which is a load.

Figure 2:
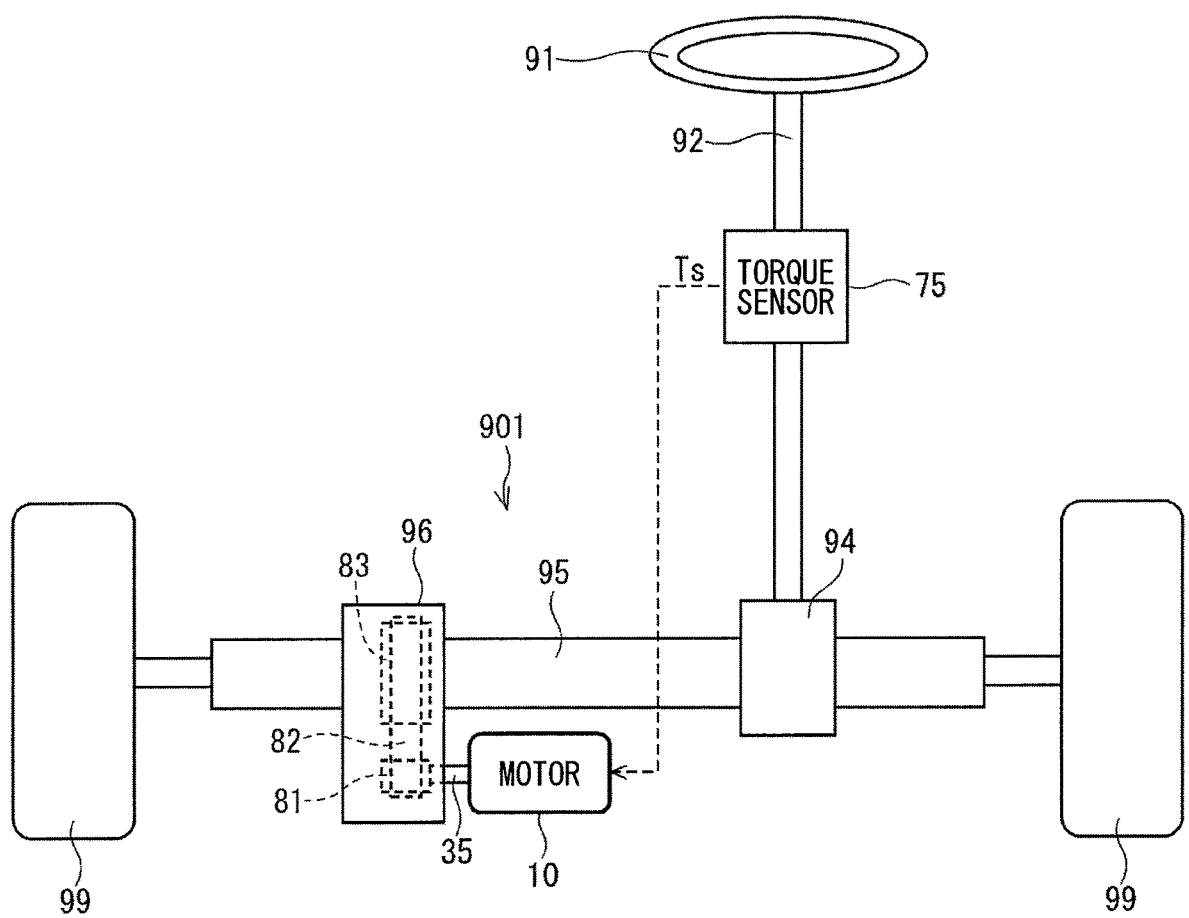
FIG. 2 is an overall configuration diagram of a parallel rack type EPS which is an example of an EPS (electric power steering system) to which the motor control device of each embodiment is applied.
Figure 3:
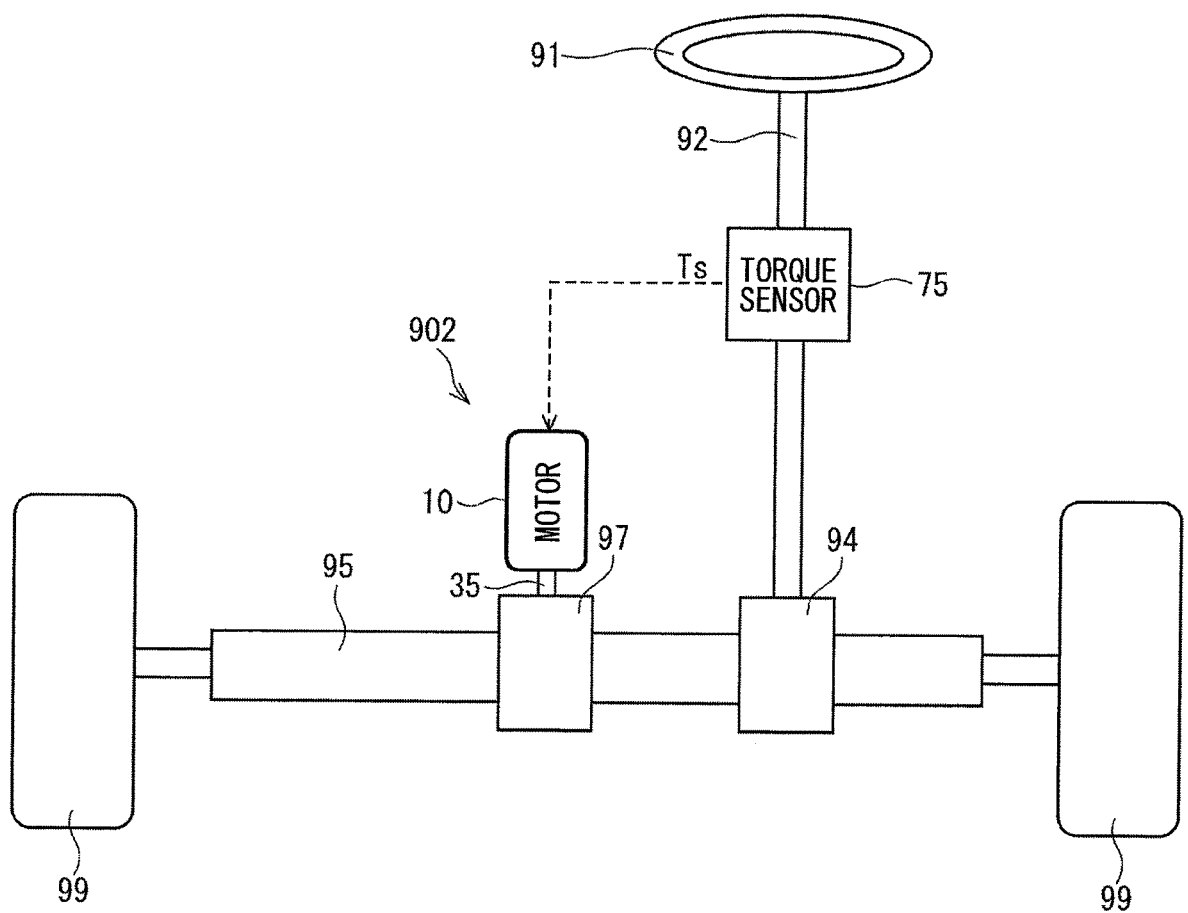
FIG. 3 is an overall configuration diagram of a dual pinion type EPS which is another example of EPS.
Figure 4:
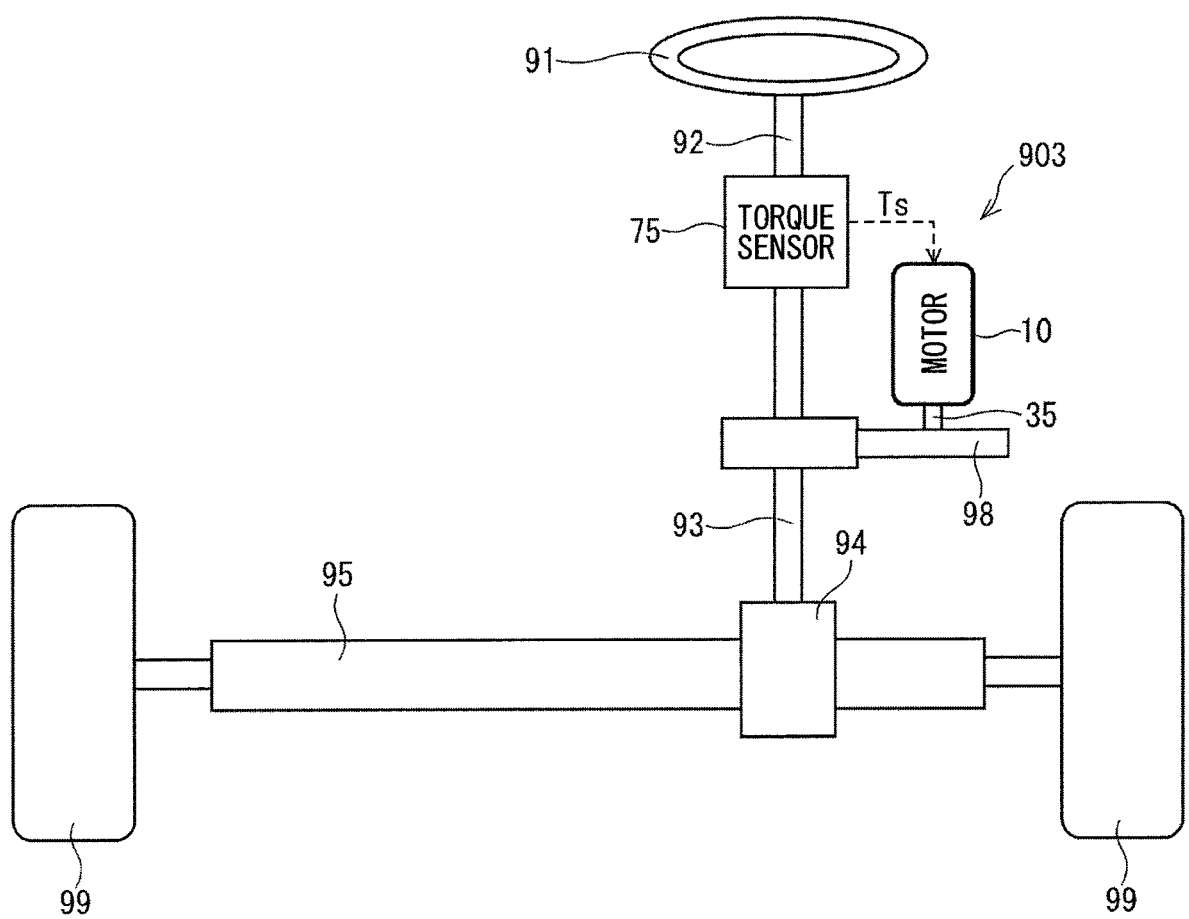
FIG. 4 is an overall configuration diagram of a column type EPS which is a further example of EPS.

The drive control unit 61 acquires a steering torque Ts from a torque sensor 75 shown in FIG. 2 to FIG. 4. The drive control unit 61 further acquires a motor current Im and a rotation angle θ of a rotor of the motor 10 as feedback inputs from the motor 10. The rotation angle θ in FIG. 1 is assumed to indicate a mechanical angle relative to one mechanical rotation of the rotor. In case of an AC motor having a plurality of pole pairs, the drive control unit 61 converts the rotation angle θ into an electrical angle and uses it for coordinate conversion calculation or the like in performing vector control, which is conventional.

The drive control unit 61 is configured to output a drive signal as an instruction to the inverter 62 based on acquired information of the steering torque Ts and the motor current Im. Since the motor drive control by the current feedback control is known well, no detailed description will be made. The inverter 62 is configured to operate based on the drive signal instructed from the drive control unit 61 and apply a drive voltage Vd to the motor 10.

In the EPS, when a road wheel of a vehicle rides on a curbstone while running, for example, the road wheel is rapidly turned by external force. As a result, torque is possibly reversely applied from the load such as the rack shaft 95 to the motor 10. At this time, the rotation angular velocity and torque of the motor 10 may exceed respective normal upper limit values which are realized or experienced during normal drive control and predetermined. Therefore, in the motor 10 of the EPS, structural members related to the rotation of the shaft or the torque transmission to the load are required to have durability strength in a rotation range realized by the normal drive control as well as strength to resist torque inversely applied from the load.

Hereinafter, the structural members of the motor 10 concerning the rotation of the shaft or the torque transmission to the load, which are target objects of designing the durability strength against the reverse input torque, will be collectively referred to as a protection target member, which is to be protected. Specific types of the protection target member will be described later with reference to FIG. 5 and FIG. 6. Mechanical stress which the protection target member receives the reverse input torque from the load is referred to as a rotation stress. Accumulation of rotation stress causes abrasion, deterioration, etc. of the protection target member.

It is difficult to accurately predict the rotation stress occurring over several years, which is a service life or a period of use of a vehicle. Designing the strength of the protection target member in anticipation of a sufficient safety factor increases a size and weight of a product, resulting in an increase in cost. Therefore, the motor control device 60 according to the present embodiment includes a rotation stress check unit 65 which is configured to appropriately evaluate the rotation stress, which the protection target member receives, and determine that the rotation stress is abnormal when the rotation stress is excessive. The motor control device 60 further includes the differentiation unit 63 that calculates the rotation angular velocity $\omega$ as information inputted to the rotation stress check unit 65 and the second-order differentiation unit 64 that calculates the rotation angular acceleration $\alpha$.

The differentiation unit 63 is configured to differentiate the rotation angle $\theta$ with time to calculate the rotation angular velocity $\omega$ of the motor 10. The rotation angular velocity $\omega$ [rad/s] is converted into a unit such as a rotation speed [rpm] as appropriate. In this specification, however, the term "rotation angular velocity" and the symbol $\omega$ are used to indicate not only a value directly expressed in units of [rad/s] but also other values such as the rotation speed [rpm].

The reason is that it is difficult to distinguish whether the term "rotation number" indicates the number of rotations per unit time, that is, rotation speed, or simply the number of rotations regardless of time. In addition, a symbol N is used for the number of repetition of check processing described later and hence the symbol N is not used to indicate the rotation speed. Therefore, in this specification, the number of rotations per unit time is described as "rotation angular velocity $\omega$" irrespective of the unit.

The second-order differentiation unit 64 is configured to differentiate the rotation angle $\theta$ with time twice to calculate the rotation angular acceleration $\alpha$ of the motor 10. In this specification, similarly to the rotation angular velocity $\omega$ described above, the term "rotation angular acceleration" and the symbol $\alpha$ are used to indicate not only a value directly expressed in units of rad/s$^2$ but also other values which are convertible into other units. For example, since it is in the relationship of "torque=force×distance=mass×distance×acceleration," the torque can be treated as a correlated value of the rotation angular acceleration under a condition that the mass and the distance are constant.

Hereinafter, the information of the rotation angular velocity $\omega$ and the rotation angular acceleration $\alpha$ inputted to the rotation stress check unit 65 are collectively referred to as "rotation evaluation value." When an excessive angular velocity $\omega$ is applied to the motor 10, a centrifugal force acts on the rotor and a rotation stress is applied in the radial direction of the rotor. In order to secure centrifugal strength of a rotating body that can withstand an excessive rotation angular velocity, reinforcement such as padding is necessary and the mass of the rotating body is increased. Further, when the rotation angular acceleration $\alpha$ is applied to the motor 10 and the rotational fluctuation occurs, for example, a torque is applied between the shaft and a rotor core. In order to secure fixing force to withstand excessive torque, reinforcement such as upsizing of a shaft diameter is necessary, and the mass and the moment of inertia of the rotating body increase.

Therefore, the rotation stress check unit 65 of the present embodiment evaluates the rotation stress based on the information of the rotation angular velocity $\omega$ and the rotation angular acceleration $\alpha$ actually applied to the motor 10 as a rotation evaluation value. In the EPS, the rotation evaluation value is defined in accordance with a rotational direction of a steering wheel relative to a neutral position, for example, as positive and negative when the steering wheel is turned in a right direction and a left direction, respectively, from the neutral position. Basically, an absolute value of the rotation evaluation value is used in the determination by the rotation stress check unit 65 of the present embodiment. That is, the determination level is not changed depending on the rotation direction.

The rotation stress check unit 65 compares the absolute values $|\omega|$ and $|\alpha|$ of the rotation evaluation values acquired from the differentiation unit 63 and the second-order differentiation unit 64 with stress threshold values. These stress threshold values are set to be larger than the upper limit values realized in the normal drive control. The rotation stress check unit 65 determines a rotation stress abnormality when the absolute value of the rotation evaluation value exceeds the stress threshold value. An example of specific check processing executed by the rotation stress check unit 65 will be described later.

Information about the rotation stress abnormality determined by the rotation stress check unit 65 is notified to a vehicle control device 71 via a CAN bus 70 which is an in-vehicle LAN, for example. Specifically, the vehicle control device 71 is configured as a vehicle ECU, and centrally controls an operation of the vehicle based on information supplied from each portion of the vehicle. In the configuration shown in FIG. 1, when the rotation stress check unit 65 determines a rotation stress abnormality, such determination information is supplied to the vehicle control device 71. Upon receiving the notification, the vehicle control device 71 outputs an alarm by display on an instrument panel, warning sound, etc., thereby notifying the driver of the abnormality.

Further, the motor control device 60 internally includes a storage device 66 such as a nonvolatile ROM that stores the abnormal value when the absolute values $|\omega|$ and $|\alpha|$ of the rotation evaluation values exceed the stress threshold values. For example, it is possible to diagnose the rotation stress by retrieving data stored in the storage device 66 at vehicle maintenance time such as regular inspections of the vehicle. As shown in FIG. 1, the storage device 66 may store only maximum values $|\omega|$max and $|\alpha|$max of the absolute values of the rotation evaluation values exceeding the stress threshold values. Thereby, the storage function of the storage device 66 can be minimized.

Next, the overall configuration of various EPS types to which the motor control device 60 of the present embodiment is applied will be described with reference to FIG. 2 to FIG. 4. FIG. 2 shows a parallel rack type EPS 901. FIG. 3 shows a dual pinion type EPS 902. FIG. 4 shows a column type EPS 903. In each EPS shown in FIG. 2 to FIG. 4, steering torque by the driver is transmitted from a steering wheel 91 to a column shaft 92, and rotational motion of the column shaft 92 is converted into linear motion of a rack shaft 95 by a pinion gear 94. Then, a pair of road wheels 99 is steered by an angle corresponding to the linear motion displacement of the rack shaft 95. A torque sensor 75 is provided on the column shaft 92 to detect the steering torque Ts. The motor 10 generates assist torque for assisting a driver's steering operation by power based on the steering torque Ts.

In the parallel rack type EPS 901 shown in FIG. 2, the motor 10 is attached to a housing 96 provided on the rack shaft 95, and a shaft 35 which is a rotating shaft of the motor 10 is arranged in parallel to the rack shaft 95. Rotation of the shaft 35 is transmitted from a pulley 81 on the motor side via a belt 82 to a pulley 83 of the rack shaft side while being decelerated. The rotation of the pulley 83 power-assists the linear motion of the rack shaft 95 through a conversion mechanism (not shown). In place of the pulley 83, the rotational power may be transmitted by a gear.

In the dual pinion type EPS 902 of FIG. 3, in addition to the pinion gear 94 for converting the rotation of the column shaft 92 into the linear motion, a pinion gear 97 for converting the rotation of the motor 10 to the linear motion of the rack shaft 95 is provided on the rack shaft 95. The rotation of the shaft 35 of the motor 10 is converted while being decelerated by the pinion gear 97, and power-assists the linear motion of the rack shaft 95.

In the column type EPS 903 of FIG. 4, the motor 10 is disposed in the vicinity of the column shaft 92. The rotation of the shaft 35 of the motor 10 is transmitted to an output shaft 93 provided between the column shaft 92 and the pinion gear 94 while being decelerated through a power transmission mechanism 98. Torque of the output shaft 93, to which the assist torque is added to the steering torque, is converted by the pinion gear 94 to linearly move the rack shaft 95.

Figure 5:
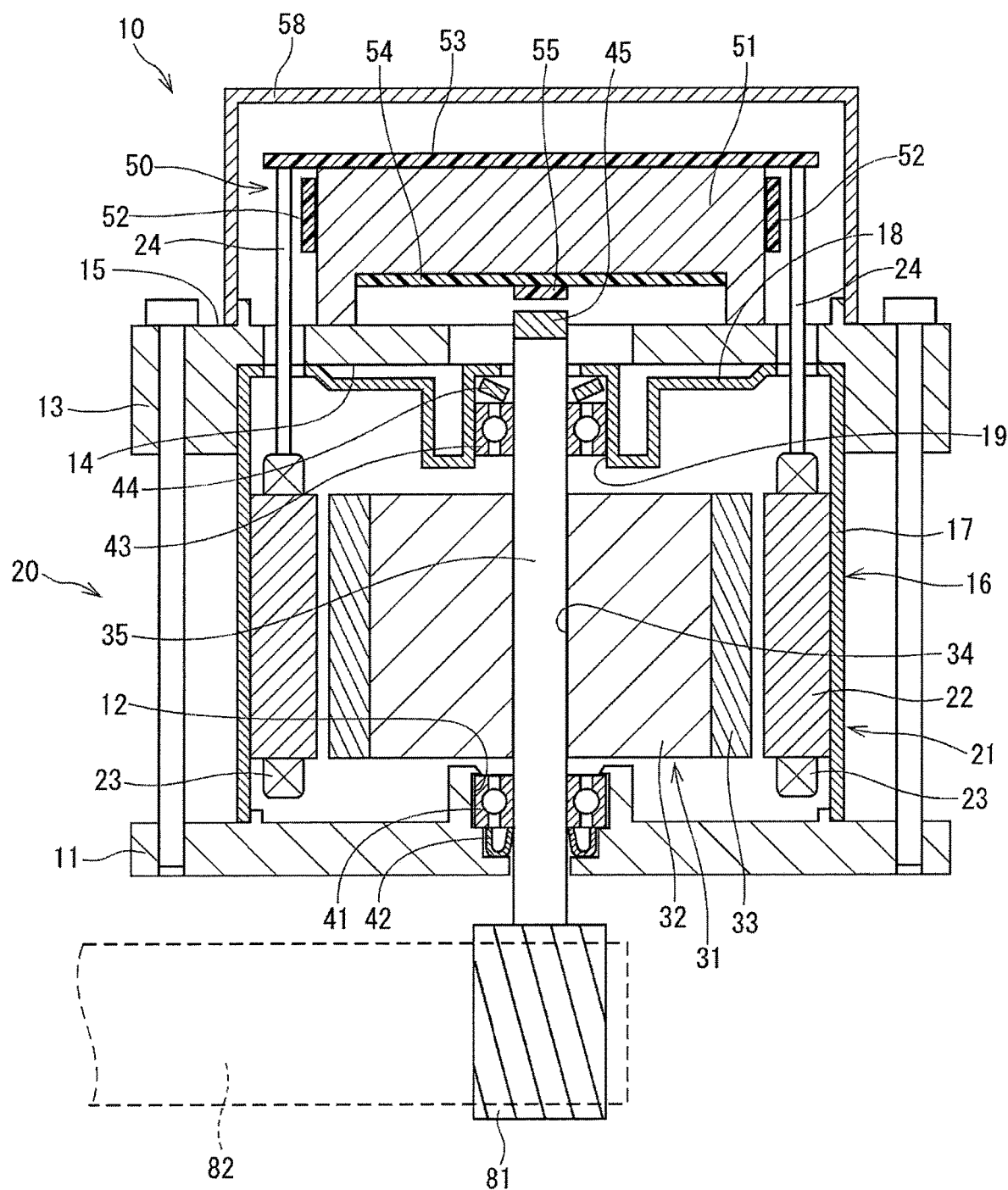
FIG. 5 is a schematic sectional view of a motor for transmitting torque to a load by using a pulley.
Figure 6:
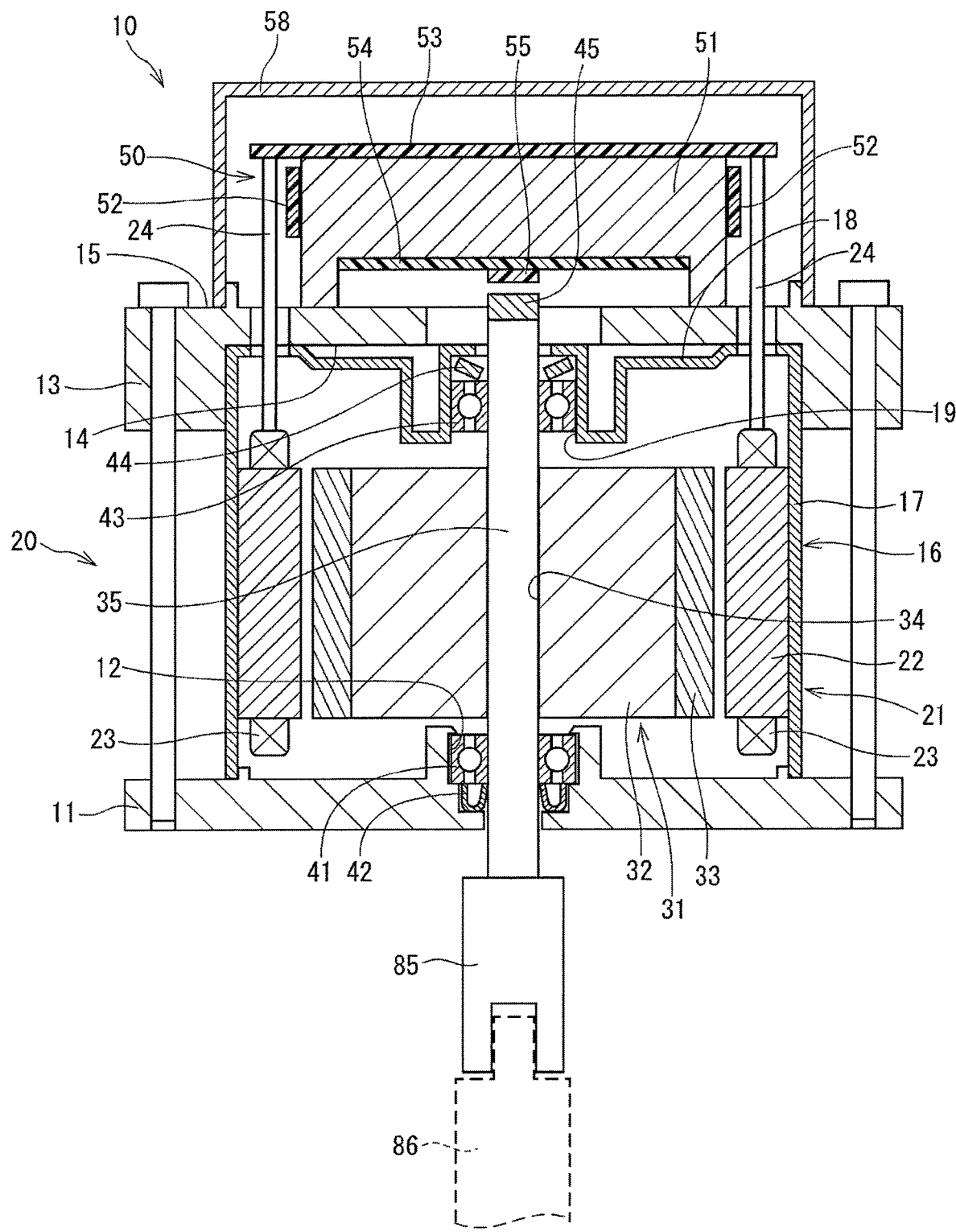
FIG. 6 is a schematic sectional view of a motor for transmitting torque to a load by using a joint.

Next, an internal configuration of the motor 10 and an example of a transmission configuration of the output torque will be described with reference to FIG. 5 and FIG. 6. The motor 10 is a three-phase brushless motor of an electromechanically-integrated type in which a rotation mechanism portion and an electronic control portion are integrated into a single unit. In FIG. 5 and FIG. 6, the output shaft side shown in the lower side in the figures is referred to as a front, and the control side shown in the upper side in the figures is referred to as a rear side. A rotation mechanism portion 20 of the motor 10 is assembled in a casing formed of a front frame 11, a rear frame 13 and a motor case 16. Each member is provided in a shape of a rotating body with the shaft 35 as its central axis.

At a center of the front frame 11, a front bearing accommodation portion 12 is formed. A front bearing 41 and an oil seal 42 are accommodated in the front bearing accommodation portion 12. The motor case 16 has a bottomed cylindrical shape having a cylindrical portion 17 and a bottom portion 18. An open end of the cylindrical portion 17 is in contact with the front frame 11. The bottom portion 18 is in contact with a front-side bottom surface 14 of the rear frame 13. A rear bearing accommodation portion 19 is formed at the center. A rear bearing 43 and a washer 44 are accommodated in the rear bearing accommodation portion 19. A rear side end face 15 of the rear frame 13 is in contact with a heat sink 51 of a control circuit unit 50.

A stator 21 includes a stator core 22, windings 23 of three phases and lead wires 24. The stator core 22 is provided along an inner wall of the cylindrical portion 17 of the motor case 16, and the windings 23 are wound thereabout. Ends of the windings 23 of the respective phases are connected to a power circuit board 53 via the lead wires 24. The rotor 31 includes a rotor core 32 and a plurality of permanent magnets 33 and is rotatably provided inside the stator 21. The permanent magnets 33 are provided such that N poles and S poles are alternately arranged in a circumferential direction and oppose an inner surface of the stator core 22. Three-phase alternating current is supplied to the windings 23 to generate a rotating magnetic field in the stator 21 for rotating the rotor 31 and generating torque.

The shaft 35 is inserted into a shaft hole 34 formed at the center of the rotor core 32, and its intermediate portion in the axial direction is fixed to the rotor core 32. On the front side of the rotor core 32, the shaft 35 is rotatably supported by the front bearing 41. The oil seal 42 seals lubricating oil on a more front side of the front bearing 41. On the rear side of the rotor core 32, the shaft 35 is rotatably supported by the rear bearing 41. The washer 44 presses the shaft 35 and the rotor core 32 toward the front side via the rear bearing 43. A sensor magnet 45 is attached to an axial end of a rear side of the shaft 35.

The control circuit unit 50 is housed in a space inside the cover 58. The control circuit unit 50 includes the heat sink 51, the semiconductor modules 52, the power circuit board 53, a control circuit board 54, a rotation angle sensor 55 and the like. The semiconductor modules 52 which form an inverter and the like are provided along a side surface of the heat sink 51. The power circuit board 53, on which various electronic components are mounted, and the control circuit board board 54 are provided along both axial end faces of the heat sink 51. At the center of the control circuit board 54, the rotation angle sensor 55 using such as a magnetoresistance element is provided to face the sensor magnet 45.

Since the configuration of the electromechanically-integrated motor is known well, detailed explanation is omitted. Here, in addition to the shaft 35 and the rotor core 32, the front bearing 41, the rear bearing 43, the oil seal 42, the sensor magnet 45 and the like are members that receive rotation stress when the shaft 35 rotates. That is, each of these structural members is the protection target member.

In the output torque transmission configuration shown in FIG. 5, the pulley 81 is provided on a front side end portion of the shaft 35. The pulley 81 is a member that transmits torque to the rack shaft side pulley 83 via the belt 82 in the parallel rack type EPS shown in FIG. 2, for example. In the output torque transmission configuration shown in FIG. 6, a joint 85 is provided on the front side end portion of the shaft 35. The joint 85 is connected to a connecting shaft 86 on a load side with a fitting portion, which has a shape such as a D-shape or an I-shape for restricting relative rotation. The joint 85 is a torque transmitting member in the dual pinion type EPS shown in FIG. 3 and the column type EPS shown in FIG. 4. As described above, such members as the pulley 81 and the joint 85 relating to the torque transmission to the load also undergo rotation stress accompanying the rotation of the shaft 35 and therefore each of those is the protection target member.

Next, referring to FIG. 7 to FIG. 12, examples of check processing which the rotation stress check unit 65 is configured to execute will be described.

<First Check Processing Example>

Figure 7:
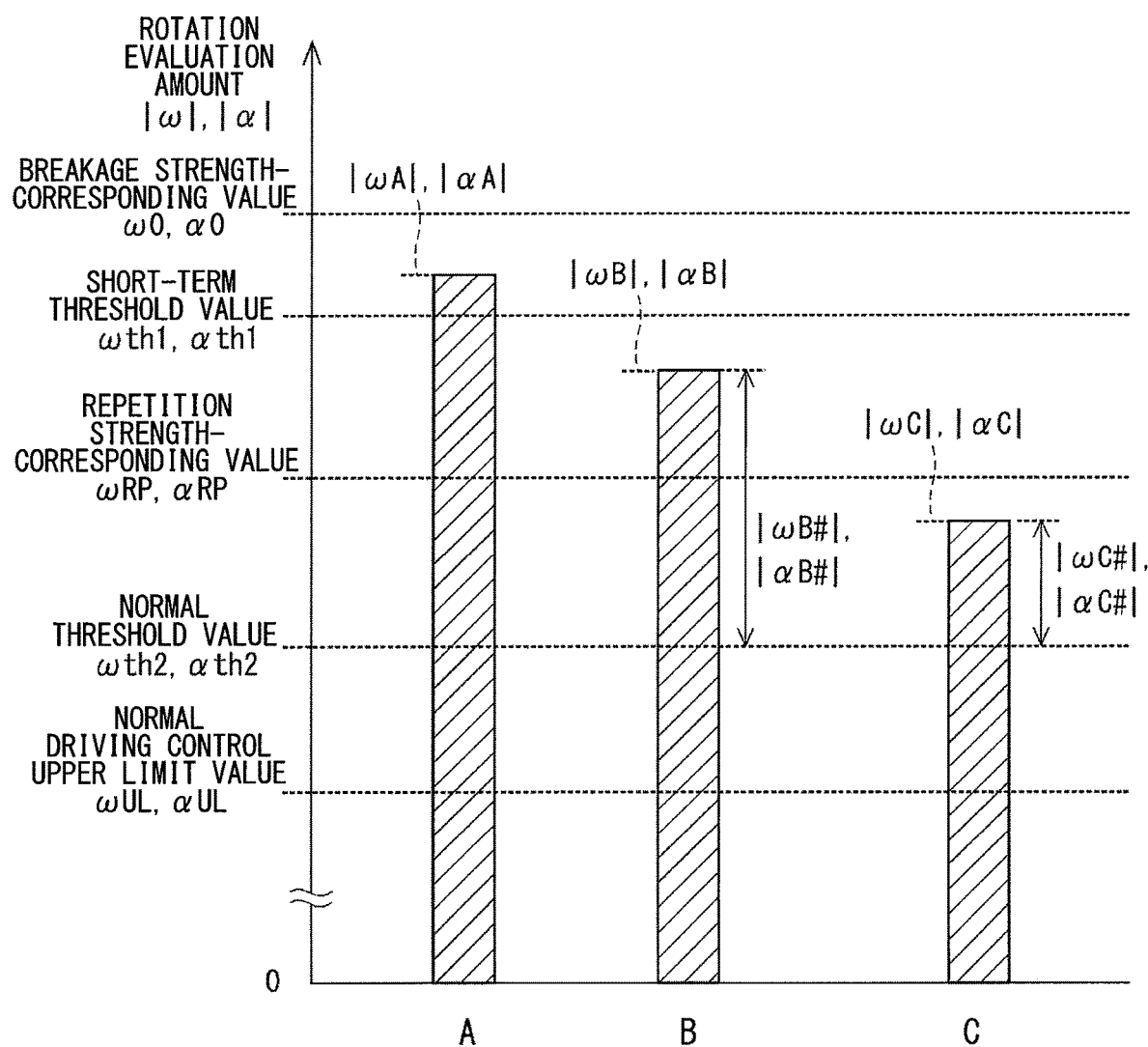
FIG. 7 is a graph showing setting of a stress threshold value (short-term threshold value and normal threshold value)

A first check processing example will be described with reference to FIG. 7 to FIG. 12. With reference to FIG. 7, setting of a stress threshold value used in the first check processing example will be described. In the first check processing example, two levels of short-term threshold values ωth1, αth1, and normal threshold values ωth2, αth2 are set as the stress threshold values. It is to be noted that the normal threshold values may be set to a plurality of levels, in which case the stress threshold values of three levels or more are set together with the short-term threshold value.

The rotation evaluation values corresponding to a breakage strength and a repetition strength of the protection target member are indicated as breakage strength equivalent values ω0, α0 and repetition strength equivalent values ωRP and αRP, respectively. For example, for the shaft 35, the breakage strength is the breaking strength of a shaft material and the repetitive strength is replaced by a shaft fatigue strength. It is to be noted that an integrated stress value during motor driving, a shaft fatigue strength, a collision stress and a shaft material strength have the relation "Integrated stress value during motor driving<Shaft fatigue strength<Collision stress<Shaft material strength." The upper limit values of the rotation evaluation values realized or encountered by normal drive control are expressed as ωUL and αUL. The short-term threshold values ωth1, αth1 and the normal threshold values ωth2, αh2 are set to the following relationship with respect to each physical property value.

$$\omega UL < \omega th2 < wRL < \omega th1 < \omega 0 \text{ and}$$
$$\alpha UL < \alpha th2 < \alpha RP < \alpha th1 < \alpha 0$$

The rotation stress check unit 65 determines that the short-term stress abnormality is present when the absolute values |ω|, |α| of the rotation evaluation values exceed the short-term threshold values ωth1, αth1 once. Further, the rotation stress check unit 65 calculates conversion values based on the absolute values |ω|, |α| when the absolute values |ω|, |α| of the rotation evaluation values exceed the normal threshold values ωth2, αth2, and determines that the integrated stress abnormality is present when the integrated values of the conversion values exceed determination threshold values.

For example, it is assumed that the rotation evaluation values of three patterns A, B and C are acquired. In the pattern A, it is determined that the short-term stress abnormality is present when the absolute values |ωA|, |αA| of the rotation evaluation values exceed the short-term threshold values ωth1, αth1 once. In the pattern B, the absolute values |ωB| and |αB| of the rotation evaluation values exceed the normal threshold values ωth2, αth2 and also repetition strength equivalent values ωRP, αRP but does not exceed the short-term threshold values ωth1, αth1. The excess values of the absolute values |ωB|, |αB| of the rotation evaluation values relative to the normal threshold values ωth2, αth2 are represented as |ωB #|, |αB #|, respectively.

In the pattern C, the absolute values |ωC|, |αC| of the rotation evaluation values exceed the normal threshold values ωth2, αth2 but does not exceed the repetition strength equivalent values ωRP, αRP nor the short-term threshold values ωth1, αth1. The excess values of the absolute values |ωC|, |αC| of the rotation evaluation values relative to the normal threshold values ωth2, αth2 are represented as |ωC #|, |αC #|, respectively. In the patterns B and C, the conversion value is calculated based on the absolute value of the rotation evaluation value, and the conversion value is integrated. Detailed example of calculation and integration of the conversion values will be described later.

It is conceivable that the frequency of occurrence of the rotation stress and the degree of influence on the protection target member differ depending on the destination, environmental temperature, use period and the like of the vehicle. An example of adjusting the stress threshold value setting according to these factors will be described with reference to FIG. 8A to FIG. 8C. In the figures, the short-term threshold value and the normal threshold value are not distinguished from each other, and are simply described as ωth, αth. Further, FIG. 8A to FIG. 8C are also referred to in second check processing example described later with reference to FIG. 11.

Figure 8A:
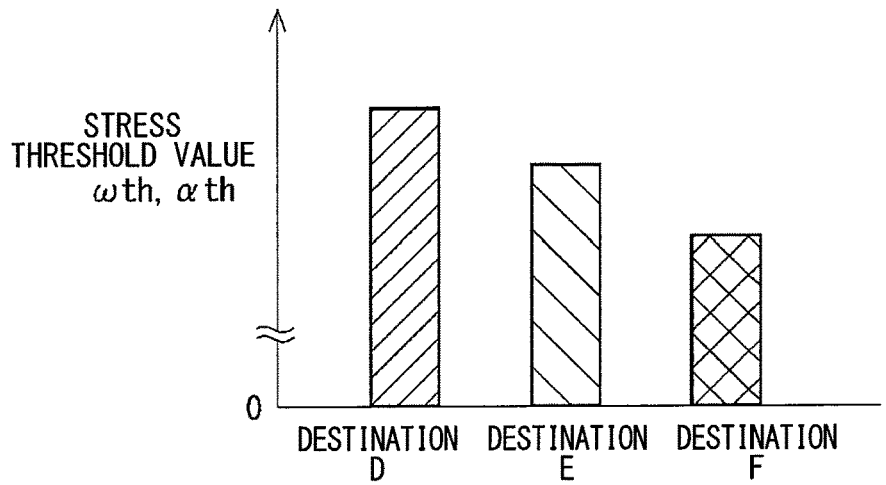
FIG. 8A is a graph showing an example of setting a stress threshold value relative to each destination of shipment of a vehicle.

FIG. 8A shows an example of setting the stress threshold values ωth, αth depending on the destination of shipment of the vehicle. For example, in a shipment destination D which is assumed to be an urban area where the road pavement rate is high, the frequency of occurrence of rotation stress is low and the protection target member is deteriorated less than in other areas. Therefore, the stress threshold values ωth, αth can be set relatively high. On the other hand, in a shipment destination F which is assumed to be an area where salt-containing wind hits a vehicle or an area where the road pavement rate is low and the road wheels frequently collide with the curbstone, the stress threshold values ωth, αth are set to be lower thereby to determine the deterioration of the protection target member at an early stage. In a shipment destination E, which is an intermediate destination between destinations D and F, the stress threshold values ωth, αth are set to medium threshold values between the values of destinations D and F.

Figure 8B:
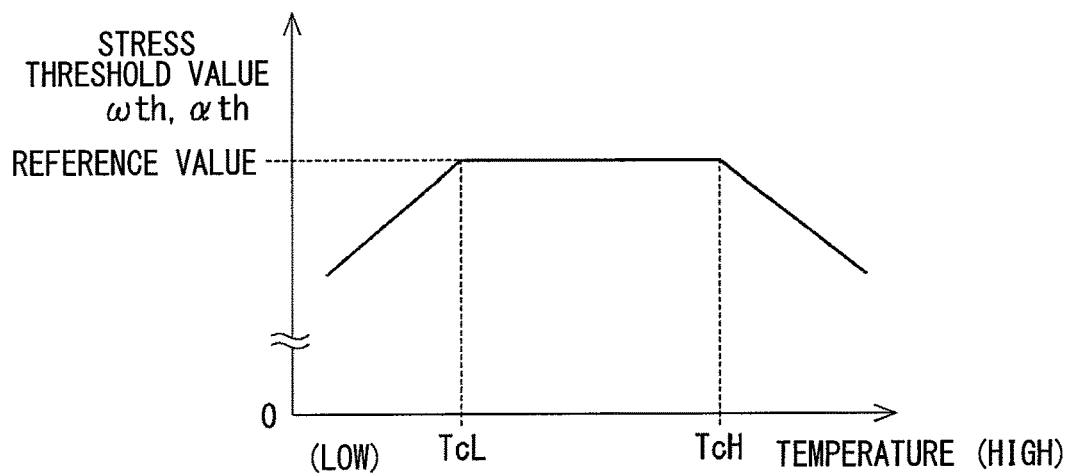
FIG. 8B is a graph showing an example of setting a stress threshold value relative to ambient temperature.

FIG. 8B shows an example of setting the stress threshold values ωth, αth depending on the environmental temperature of the vehicle. A protection target member including a rubber portion and the like and a protection target member pasted with lubricating oil tend to deteriorate more in both lower temperature environment and higher temperature environment which are outside a normal proper temperature range. Therefore, the stress threshold values ωth, αth are set to reference values in a temperature range from a lower limit temperature TcL to an upper limit temperature TcH. However, the stress threshold values ωth, αth are set to be lower as the temperature decreases in a low temperature range equal to or lower than the lower limit temperature TcL and as the temperature increases in a high temperature range equal to or higher than the upper limit temperature TcH.

Figure 8C:
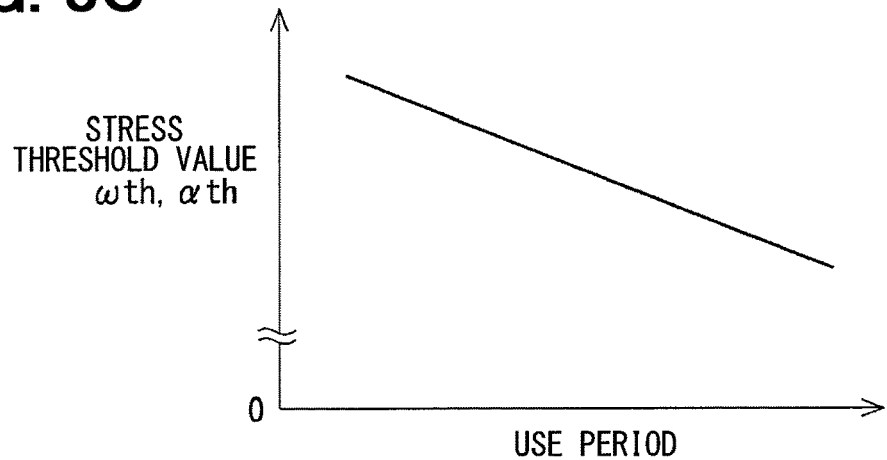
FIG. 8C is a graph showing an example of setting a stress threshold value relative to a period of use.

FIG. 8C shows an example of setting the stress threshold values ωth, αth depending on the use period of the vehicle. It is preferable that the stress threshold values ωth, αth are set to gradually decrease as any protection target members deteriorate over years as the use period of the vehicle becomes longer.

As a specific method of storing the stress threshold values ωth, αth set as described above in the rotation stress check unit 65, for example, a default value may be changed for each destination in each destination setting at the time of manufacturing the vehicle. Regarding the environmental temperature, stored values may be changed at any time by referring to a map data based on the environmental temperature acquired from the temperature sensor by the rotation stress check unit 65. Regarding the vehicle use period, a stored value may be changed by the rotation stress check unit 65 at any time based on the information of a timer, or the stored value of the rotation stress check unit 65 may be updated every periodical inspection.

Figure 9:
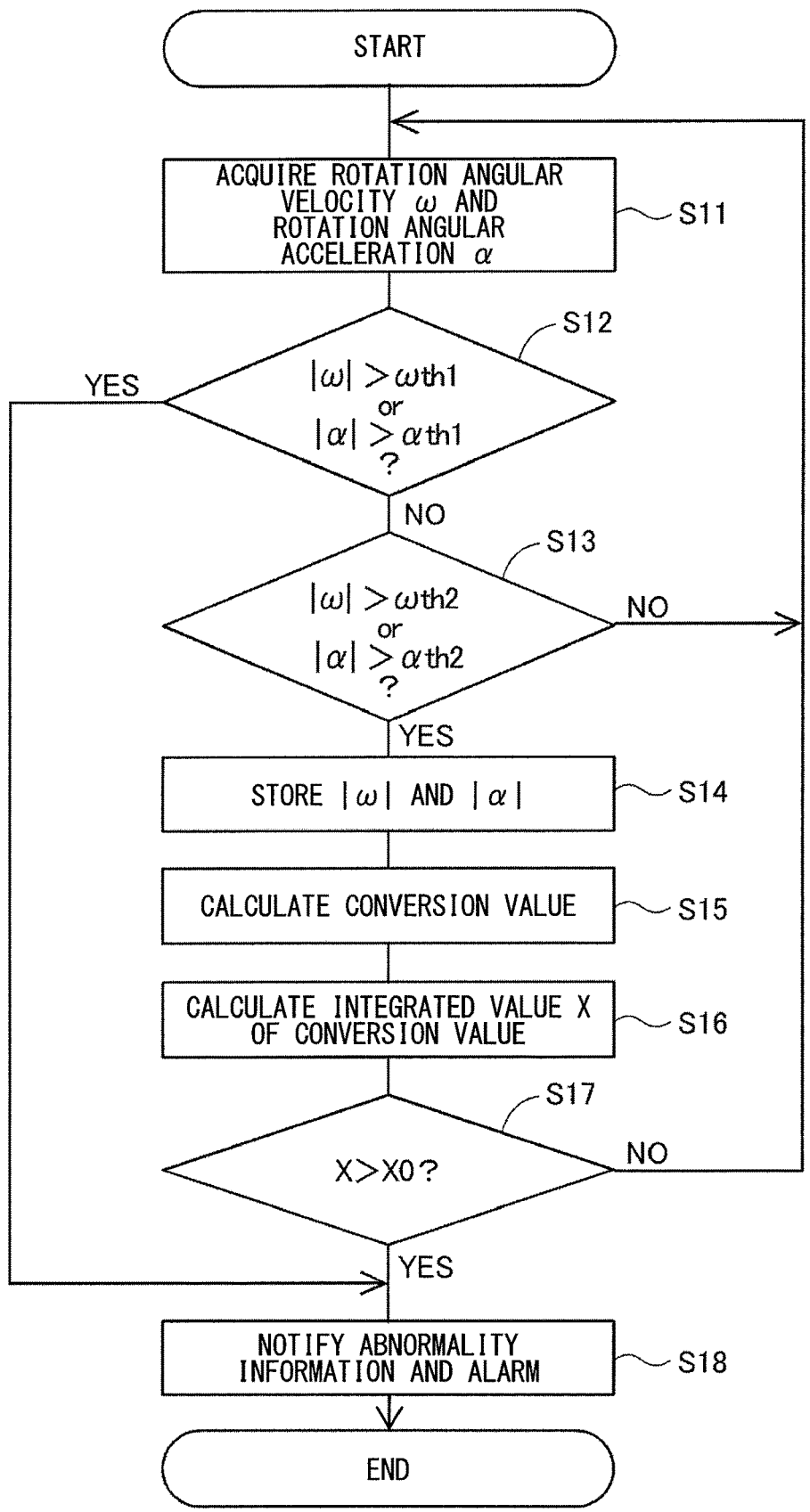
FIG. 9 is a flowchart showing a first example of check processing.

FIG. 9 shows a flowchart of a first check processing example. In the following flowcharts, a symbol S indicates a processing step. In this example, the short-term threshold values ωth1, αth1 and the normal threshold values ωth2, αth2 are set for the rotation angular velocity |ω| and the rotation angular acceleration |α| as the rotation evaluation values, respectively. In the following description, the absolute value of the rotation angular velocity |ω| and the absolute value of the rotation angular acceleration |α| are referred to simply as a rotation angular velocity |ω| and a rotation angular acceleration |α|, respectively.

In step S11, the rotation stress check unit 65 acquires the rotation angular velocity ω and the rotation angular acceleration α of the motor 10 from the differentiation unit 63 and the second-order differentiation unit 64. In step S12, the rotation stress check unit 65 checks whether the rotation angular velocity |ω| exceeds the short-term threshold value ωth1 or whether the rotation angular acceleration |α| exceeds the short-term threshold value αth1. When the check result is YES and NO in S12, S18 and S13 are executed, respectively.

In step S13, the rotation stress check unit 65 further checks whether the rotation angular velocity |ω| exceeds the normal threshold value ωth2 or whether the rotation angular acceleration |α| exceeds the normal threshold value αth2. When the check result is YES and NO in S13, S14 and S11 are executed, respectively. In step S14, the rotation angular velocity |ω| exceeding the normal threshold value ωth2 or the rotation angular acceleration |α| exceeding the normal threshold value αth2 is stored.

Whether to use the rotation angular velocity |ω| or the rotation angular acceleration |α| as the rotation evaluation value may be appropriately selected based on the deterioration characteristics and the like of components assumed as the protection target member. For example, for the oil seal 42, it is appropriate to checks whether the rotation angular velocity |ω| exceeds the short-term threshold ωth1 (that is, instantaneous permissible limit value) or the normal threshold value ωth2. On the other hand, for the sensor magnet 45, it is appropriate to checks whether the rotation angular acceleration |α| exceeds the short-term threshold value αth1 or the normal threshold value αth2.

In step S15, the rotation stress check unit 65 calculates a conversion value corresponding to the rotation angular velocity |ω| or the rotation angular acceleration |α|. In step S16, the rotation stress check unit 65 then calculates an integrated value X of the conversion value. Then, in step S17, the rotation stress check unit 65 checks whether the integrated value X exceeds a determination threshold value X0. When the check result in S17 is YES and NO, S18 and S11 are executed, respectively. When it is determined as YES in S12, the rotation stress check unit 65 determines that the abnormality is a short-term stress abnormality. When it is determined as YES in S17, the rotation stress check unit 65 determines that the abnormality is an integrated stress abnormality, that is, a cumulative stress abnormality or a long-term stress abnormality. The rotation stress check unit 65 notifies the vehicle control device 71 of the abnormality information in S18. As shown in FIG. 1, in a configuration capable of communicating with the in-vehicle LAN, the rotation stress check unit 65 notifies the vehicle control device 71 of the abnormality information. Upon receiving the notification, the vehicle control device 71 outputs an alarm to inform the driver of the abnormality.

In S15, the conversion value calculated as a value which indicates how many times the rotation stress due to the rotation angular velocity |ω| or the rotation angular acceleration |α| is as large as the rotation stress, which corresponds to the short-time threshold ωth1, αth1 or a breakage strength equivalent values ω0, α0. With reference to the rotation angular acceleration α as an example, exemplary calculation and integration of the conversion value will be described.

(1) Every time the rotation angular acceleration |α| exceeds the normal use threshold value αth2, "1" is integrated as the conversion value X. That is, based on the number of times the rotation angular acceleration |α| exceeds the normal threshold value αth2, the stress abnormality is determined.

(2) Excess value by which the rotation angular acceleration |α| exceeds the normal threshold value αth2, that is, |αB #| and |αC #| shown in FIG. 7 are integrated as the conversion value X.

Figure 10:
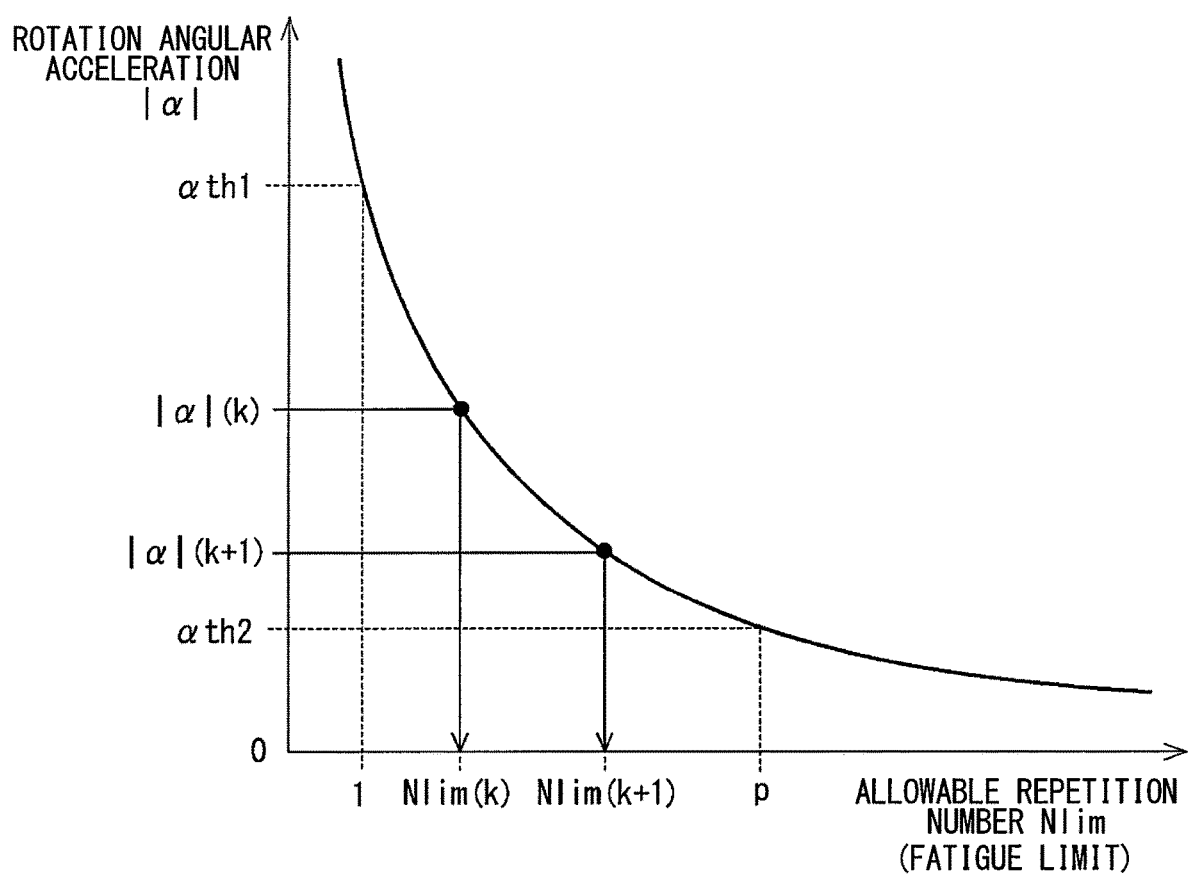
FIG. 10 is a characteristic graph showing a relationship between a rotation angular acceleration and an allowable repetition number (fatigue limit)

(3) In case that the protection target member is the shaft 35, the conversion value is calculated suitably as shown in FIG. 10. The rotation stress check unit 65 has a data map of an inverse proportional type in which a relationship between an allowable repetition number Nlim indicating a fatigue limit and the rotation angular acceleration |α| is defined. The allowable repetition number Nlim corresponding to the short-term threshold value αth1 is 1. Further, the allowable repetition number Nlim corresponding to the normal threshold value αth2 is p (1<p).

The rotation stress check unit 65 calculates an allowable repetition numbers Nlim(k) and Nlim(k+1) corresponding to the k-th and (k+1)-th rotation angular accelerations |α|(k) and |α|(k+1) exceeding the normal threshold value αth2 by using the data map or mathematical calculation. Then, the rotation stress check unit 65 integrates a reciprocal of the allowable repetition number Nlim as the conversion value X according to the following mathematical equation (1) with "k" being "1" to "n" and determines that there is a stress abnormality when the integrated value exceeds 1. That is, it is determined that a fraction of 1/Nlim of the rotation stress is accumulated when the rotation evaluation value that becomes the allowable repetition number Nlim occurs once.

$$X=\Sigma[1/Nlim(k)] \qquad (1)$$

<Second Check Processing Example>

Figure 11:
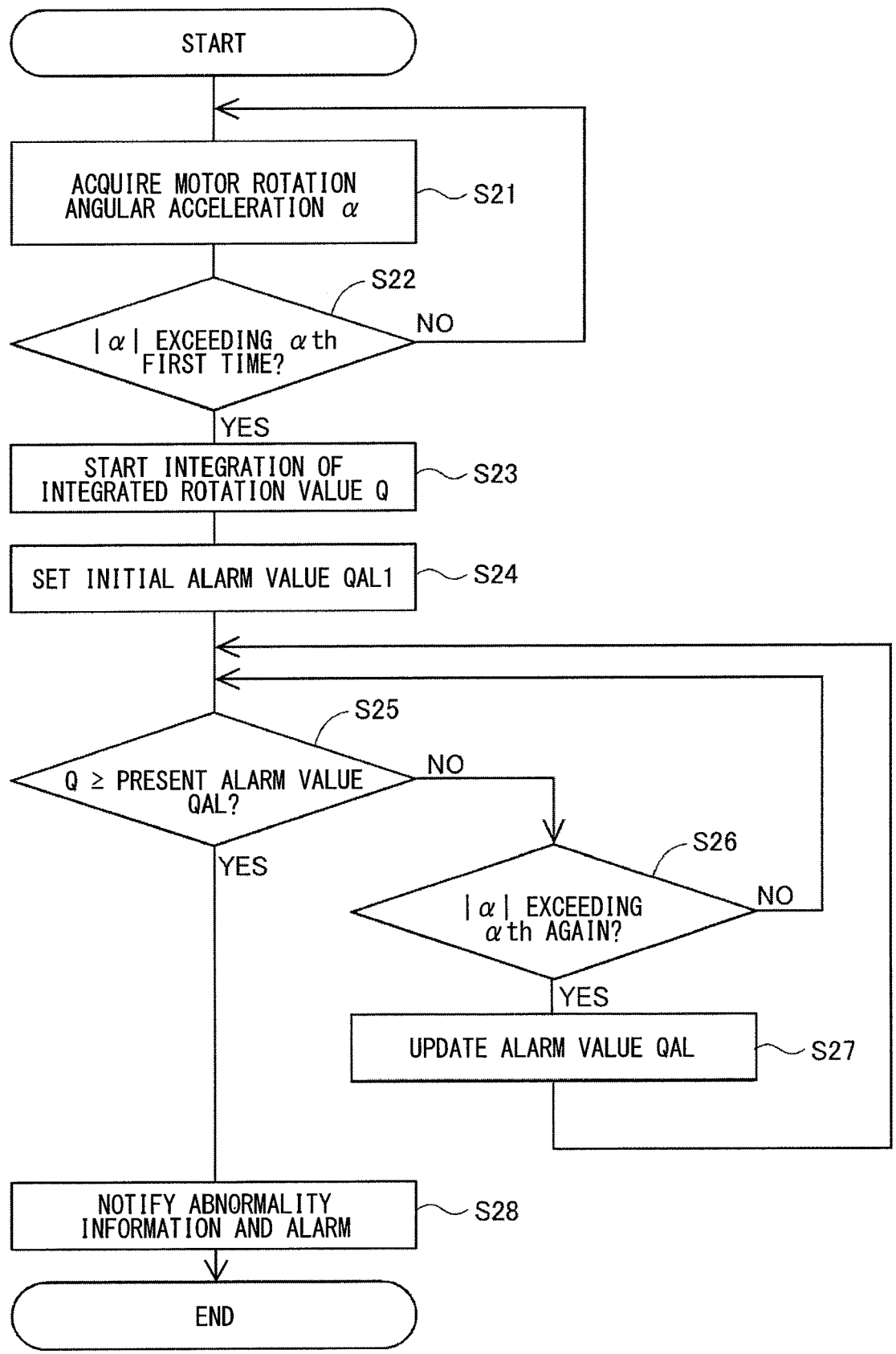
FIG. 11 is a flowchart showing a second example of check processing.
Figure 12:
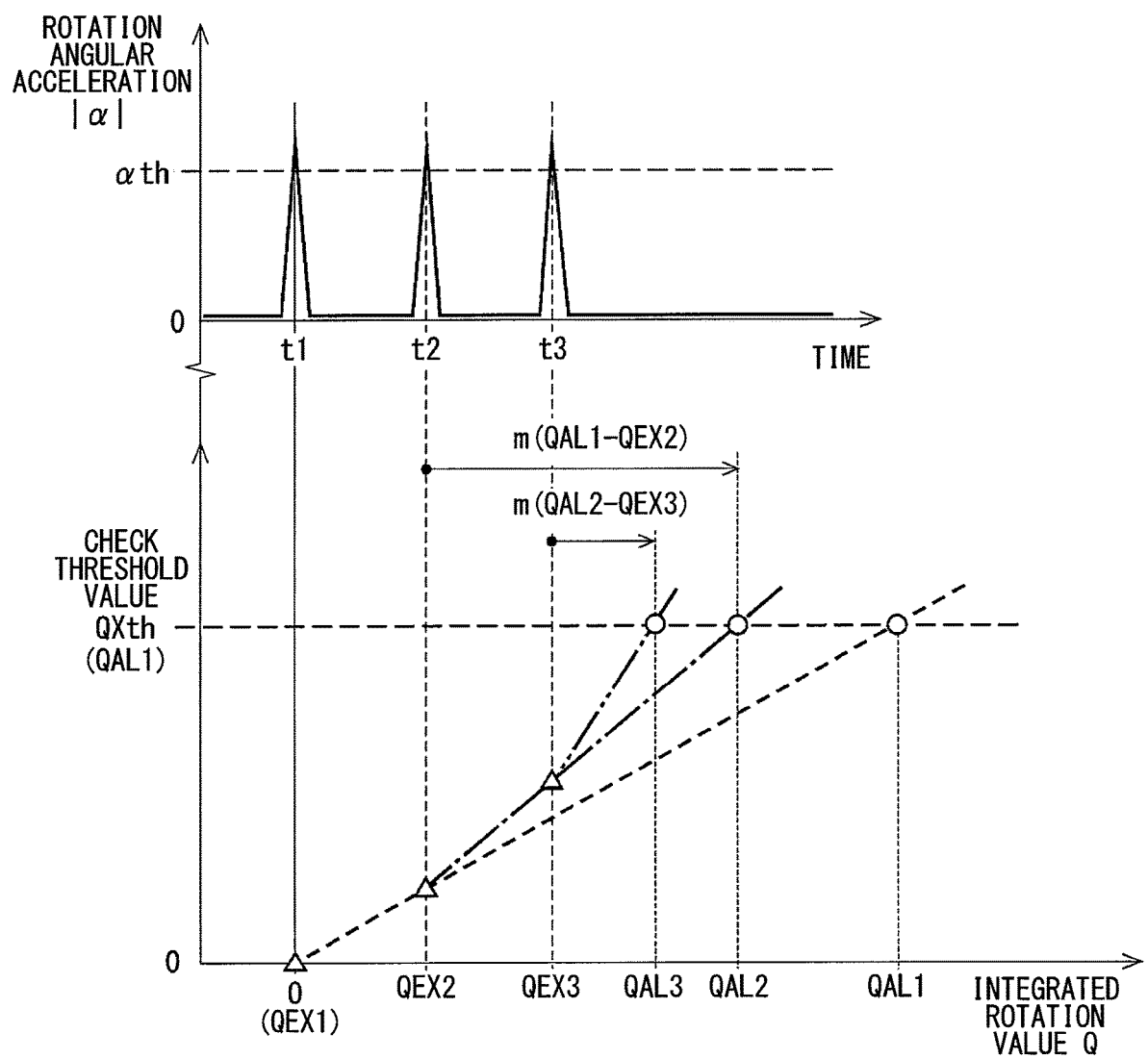
FIG. 12 is an operation chart showing a relationship between a integrated rotation value, which is from time when a rotation angular acceleration exceeds a stress threshold value for the first time, and a determination threshold value.

Regarding a second check processing example, reference is made to a flowchart shown in FIG. 11 and a characteristic chart shown in FIG. 12. The second check processing example is effective particularly when the protection target member is the bearings 41 and 43. The rotation stress check unit 65 uses the rotation angular acceleration α as the rotation evaluation value and uses one stress threshold value αth. The stress threshold value αth is set to be larger than the upper limit values ωUL, αUL which are realized by the normal drive control similarly to the first check processing example.

From the structure of the bearings 41 and 43, if a bearing race surface is scratched, the flaw spreads as it rotates. The life of the bearings 41 and 43 is shortened as the number of flaws on the race surface increases. Therefore, in the second check processing example, the stress abnormality is checked based on this deterioration characteristic as to how many rotations the bearings 41 and 43 can endure after the rotation angular acceleration |α| exceeds the normal threshold value αth2 for the first time. Here, a total distance or angle by which the shaft 35 of the motor 10 has rotated is defined as an integrated rotation value Q.

An upper half illustration of FIG. 12 shows that the rotation angular acceleration |α| exceeds the threshold value αth at times t1, t2 and t3. Although the rotation angular acceleration |α| instantaneously increases at each time point in the figure, a profile is not limited to this shape but the rotation angular acceleration |α| may gradually increase and decrease. A lower half illustration of FIG. 12 shows a relationship between the integrated rotation value Q measured from time t1 as a measurement start point and a check threshold value QXth. This relationship will be described in detail below.

The rotation stress check unit 65 acquires the rotation angular acceleration α of the motor 10 from the second-order differentiation unit 64. At time t1 when the rotation angular acceleration |α| exceeds the threshold value αth for the first time, the rotation stress check unit 65 determines YES in S22, and starts calculating the integrated rotation value Q in S23 by integration at time t1 as the start time. As shown by a thick broken line in FIG. 12, the integrated rotation value Q linearly increases from the integrated rotation value QEX1, which is 0 at the time of calculation start time. A scale on a horizontal axis of the operation chart shown in FIG. 12 represents the rotated distance or angle, which is not related to the length of time. That is, the time corresponding to a fixed length on the horizontal axis becomes short when the motor 10 continuously rotates for power-assisting the steering operation of a driver as in traveling on an S-curve, and becomes long when the motor 10 rotates only occasionally in traveling on a curve road while mostly traveling on a straight road.

The rotation stress check unit 65 sets an initial alarm value QAL1 in S24. The initial alarm value QAL1 means the integrated rotation value Q up to which the bearings 41 and 43 can be used durably when it is assumed that the rotation angular acceleration |α| never again exceeds the threshold value αth after the measurement start time. That is, the value on the horizontal axis when the value of the vertical axis of the broken line reaches the check threshold value QXth is the initial alarm value QAL1. Assuming that the slope of the broken line is 1, the initial alarm value QAL1 is equal to the determination threshold QXth.

Next, in step S25, the rotation stress check unit 65 checks whether the integrated rotation value Q has reached the current alarm value QAL, that is, whether the bearings have been used up to the durability limit. In the first execution, the current alarm value QAL is an initial alarm value QAL1. If the check result in S25 is NO, S26 is executed. When S26, it is checked whether the rotation angular acceleration lad exceeds the threshold value αth again. When the check result in S26 is YES, the alarm value QAL is updated in S27 and S25 is executed again. When the check result in S26 is NO, S25 is executed again without updating the current alarm value QAL. In this way, S25, S26 and S27 are repeated until the check result in S25 becomes YES.

When the rotation angular acceleration |α| exceeds the threshold value αth for the second time at time t2, the alarm value QAL is updated so that a remaining value is determined by multiplying a remaining value, which is from the integrated rotation value QEX2 at that time to the initial alarm value QAL1, by a positive coefficient m (0<m<1), which is less than 1. The alarm value QAL2 after updating is represented by the following equation (2).

$$QAL2=QEX2+m(QAL1-QEX2) \quad (2)$$

After updating the alarm value QAL2, the integrated rotation value Q linearly increases along a one-dot chain line having a larger slope than a broken line as shown in FIG. 12.

When the rotation angular acceleration |α| exceeds the threshold value αth for the third time at time t3, the alarm value QAL is updated again so that a remaining value is determined by multiplying a remaining value, which is from a integrated rotation value QEX3 at that time to the alarm value QAL2, by the positive coefficient m. The alarm value QAL3 after the updating is represented by a similar mathematical equation (3).

$$QAL3=QEX3+m(QAL2-QEX3) \quad (3)$$

After updating the alarm value QAL3, the integrated rotation value Q linearly increases along a two-dot chain line having a larger slope than the one-dot chain line as shown in FIG. 12. Thus, the alarm value QAL decreases each time the rotation angular acceleration |α| exceeds the threshold value αth.

When the check result is YES in S25, S28 is executed. In S28, similarly to S18 of the first check processing example shown in FIG. 9, the abnormality information is notified and the alarm is generated. As described above, in the second check processing example, the rotation stress is appropriately determined by using the deterioration characteristics of the bearings 41 and 43 that the life becomes shorter as the number of flaws on the race surface increases. As a method of simplifying the second check processing example with respect to the bearings 41 and 43, the stress abnormality may be notified and the alarm may be generated when the number of times of exceeding the threshold value αth again reaches a predetermined number after the rotation angular acceleration |α| exceeds the threshold αth for the first time.

(Advantage)

The rotation stress check unit 65 of the motor control device 60 according to the present embodiment determines the abnormality of the rotation stress applied to the protection target member based on the absolute value |ω| of the rotation angular velocity or the absolute value |α| of the rotation angular acceleration exceeding the stress threshold value ωth or αth of the motor 10. The stress threshold values ωth, αth are set to be larger than the upper limit values ωUL, αUL of the rotation angular velocity or the rotation angular acceleration which are realized in the normal drive control. As a result, the rotation stress check unit 65 can appropriately determine in accordance with the magnitude and frequency of the rotation stress actually generated that the stress abnormality, which requires replacement of the protection target member, has occurred.

Especially in the EPS, there is a possibility that an excessive torque is suddenly reversely applied to the motor 10 from the rack shaft 95 side in such a case as when the road wheel rides on the curbstone while the vehicle is running. However, the possibility varies depending on road conditions in a vehicle driving area or driving skill of the driver and hence it is difficult to assume a standard range. However, designing a strength of such a protection target member with an excessively high safety factor results in excessive quality for many vehicles. This increases size and weight of the motor 10 and results in an increase in cost.

On the other hand, in the present embodiment, the rotation stress abnormality can be determined appropriately by comparing the absolute values |ω| and |α| of the rotation evaluation value with the stress threshold values set to exceed the upper limit values realized in the normal drive control. Here, in the state determined to be the abnormal rotation stress, it is considered that the strength of the protection target member is close to the endurance limit and replacement of such a member is necessary. Therefore, assuming that such a member which is close to the endurance limit is replaced when it is determined to have the rotation stress abnormality, the protection target member can be designed to have ensure a minimum necessary strength. It is possible to design the motor 10 to be compact and lightweight by avoiding a design that is excessive in quality.

Further, the rotation stress check unit 65 can make an appropriate abnormality check which is practical by setting the threshold value according to the destination of shipment of the vehicle, the environmental temperature, the vehicle use period, etc., or selecting the calculation method and the check processing method in accordance with deterioration characteristics of the protection target member or the like. The rotation stress check unit 65 may execute check processing methods of a plurality of patterns in parallel and output the abnormality notification and alarm by comprehensively comparing the check results.

(Other Embodiment)

(A) In the configuration shown in FIG. 1, the motor control device 60 is configured as the EPS-ECU independent of the vehicle control device (vehicle ECU) 71, and the rotation stress check unit 65 included in the EPS-ECU checks the rotation stress abnormality. However, for example, when performing the first check processing example, the EPS-ECU may determine that the rotation evaluation value exceeds the normal threshold value and notifies the vehicle control device 71 of the information indicating such a determination result so that the vehicle control device 71 finally determines the abnormality by calculating the conversion value and the integrated value and output the alarm. In this case, the vehicle control device is interpreted as a part of the function of the rotation stress check unit. Further, the motor control device is interpreted as including the EPS-ECU and a part of the vehicle control device.

(B) In the above embodiment, the rotation angular velocity ω and the rotation angular acceleration α, which are calculated by differentiating the rotation angle θ of the rotor 31 with respect to time, are used as the rotation evaluation value. In this case, it is possible to effectively utilize the information of the rotation angle θ used for the feedback control in the normal motor drive control. However, a value correlated with the rotation angular velocity ω and the rotation angular acceleration α may be used as the rotation evaluation value. For example, information such as a moving speed and acceleration of the rack shaft 95 may be acquired from the vehicle control device 71 or the like and converted into a rotation evaluation value.

(C) In the above check processing examples, polarity (positive or negative) of the rotation evaluation value w and a, that is, the rotation direction, is not taken into consideration in the comparison between the absolute values |ω| and |α| of the rotation evaluation values and the stress threshold values, As another check processing example, for example, the polarity of the rotation evaluation values ω and α may also be evaluated thereby to differentiate a case where the rotation stress of the same direction is applied continuously and a case where the rotation stress of opposite directions is applied alternately.

(D) In FIG. 5 and FIG. 6 of the above embodiment, the pulley 81 and the joint 85 are shown as component parts of the motor 10 side as the protection target member provided for torque transmission to the load. From the standpoint of the manufacturer who manufactures and sells the motor 10, the belt 82 and the connecting shaft 86, which are shown in broken lines on the vehicle side, are excluded from the protection target member. However, in consideration of totality of a vehicle, the belt 82, the connecting shaft 86 and other associated component parts may also be included in the protection target member provided for the torque transmission to the load.

(E) Although the electromechanically-integrated motor is shown in FIG. 5 and FIG. 6 of the above embodiment, the present disclosure can be similarly applied to a motor in which the control unit and the rotation mechanism portion are separated and not integrated.

In addition, the motor control device of the present disclosure is not limited to the steering assist motor for EPS but can be applied to any motor that has a possibility of reverse torque input from the load.

The present disclosure should not be limited to the embodiment described above. Various other embodiments may be implemented without departing from the scope of the present disclosure.

What is claimed is:

1. A motor control device for controlling driving of a motor, which outputs torque to a load by rotation of a shaft fixed to a rotor, the motor control device comprising:
   a computer configured to determine a rotation stress abnormality indicating that a rotation stress, which is applied inversely from the load to a protection target member related to the rotation of the shaft or torque transmission to the load, is excessive based on that an absolute value of a rotation evaluation value exceeds a stress threshold value set to be larger than an upper limit value realized in normal drive control, the rotation evaluation value being an angular velocity, a rotation angular acceleration or a related value corresponding to the angular velocity or the rotation angular acceleration, wherein:
   the stress threshold value has at least two level values, which includes a short-term threshold value and one or more threshold value smaller than the short-term threshold value including a normal threshold value;
   the computer is configured to determine a short-term stress abnormality when the absolute value of the rotation evaluation value exceeds the short-term threshold value once; and
   the computer is configured to calculate a conversion value based on the absolute value of the rotation evaluation value when the absolute value of the rotation evaluation value exceeds the normal threshold value and determines an integrated stress abnormality when an integrated value of the conversion value exceeds a determination threshold value.

2. The motor control device according to claim 1, wherein:
   the computer is configured to integrates a reciprocal of a number of allowable repetitions as the conversion value at a time when the absolute value of the rotation evaluation value exceeds the normal threshold value.

3. The motor control device according to claim 1, further comprising:
   a memory configured to store the absolute value of the rotation evaluation value at a time when the computer determines that the absolute value exceeds the stress threshold value.

4. The motor control device according to claim 3, wherein:
   the memory is configured to store only a maximum value of the absolute value of the rotation evaluation value exceeding the stress threshold value.

5. The motor control device according to claim 3, wherein:
   the motor is provided to assist a steering torque in an electric power steering device in a vehicle.

6. The motor control device according to claim 1, wherein:
   the rotation evaluation value is the rotation angular acceleration.

7. A method for controlling driving of a motor, the motor outputting torque to a load by rotation of a shaft fixed to a rotor, the method comprising:

determining a rotation stress abnormality indicating that a rotation stress, which is applied inversely from the load to a protection target member related to the rotation of the shaft or torque transmission to the load, is excessive based on that an absolute value of a rotation evaluation value exceeds a stress threshold value set to be larger than an upper limit value realized in normal drive control, the rotation evaluation value being an angular velocity, a rotation angular acceleration or a related value corresponding to the angular velocity or the rotation angular acceleration, wherein the stress threshold value has at least two level values, which includes a short-term threshold value and one or more threshold value smaller than the short-term threshold value including a normal threshold value;

determining a short-term stress abnormality when the absolute value of the rotation evaluation value exceeds the short-term threshold value once; and calculating a conversion value based on the absolute value of the rotation evaluation value when the absolute value of the rotation evaluation value exceeds the normal threshold value and determines an integrated stress abnormality when an integrated value of the conversion value exceeds a determination threshold value.

8. The method according to claim 7, further comprising integrating a reciprocal of a number of allowable repetitions as the conversion value at a time when the absolute value of the rotation evaluation value exceeds the normal threshold value.

9. The method according to claim 7, further comprising storing the absolute value of the rotation evaluation value at a time when the absolute value is determined to exceed the stress threshold value.

10. The method according to claim 9, wherein storing only a maximum value of the absolute value of the rotation evaluation value exceeding the stress threshold value.

11. The method according to claim 9, wherein the motor is provided to assist a steering torque in an electric power steering device in a vehicle.

12. The method according to claim 7, wherein the rotation evaluation value is the rotation angular acceleration.

* * * * *